US011100788B2

(12) United States Patent
Horgan et al.

(10) Patent No.: US 11,100,788 B2
(45) Date of Patent: Aug. 24, 2021

(54) BUILDING ALARM SYSTEM WITH BAYESIAN EVENT CLASSIFICATION

(71) Applicant: Johnson Controls Technology Company, Auburn Hills, MI (US)

(72) Inventors: Donagh S. Horgan, Cork (IE); Eamonn O'Toole, Cork (IE)

(73) Assignee: Johnson Controls Tyco IP Holdings LLP, Milwaukee, WI (US)

( * ) Notice: Subject to any disclaimer, the term of this patent is extended or adjusted under 35 U.S.C. 154(b) by 0 days.

(21) Appl. No.: 16/667,036

(22) Filed: Oct. 29, 2019

(65) Prior Publication Data

US 2020/0135008 A1 Apr. 30, 2020

Related U.S. Application Data

(60) Provisional application No. 62/752,686, filed on Oct. 30, 2018.

(51) Int. Cl.
*G08B 29/18* (2006.01)
*G06F 17/18* (2006.01)
*G06N 7/00* (2006.01)
*G08B 13/196* (2006.01)

(52) U.S. Cl.
CPC .......... *G08B 29/185* (2013.01); *G06F 17/18* (2013.01); *G06N 7/005* (2013.01); *G08B 13/19682* (2013.01)

(58) Field of Classification Search
CPC . G08B 29/185; G08B 13/19682; G06F 17/18; G06N 7/005
USPC .......................................................... 340/541
See application file for complete search history.

(56) References Cited

U.S. PATENT DOCUMENTS

| 6,076,083 | A  | * | 6/2000  | Baker ...................... H04L 69/40 706/52 |
| 9,753,455 | B2 | * | 9/2017  | Drees ....................... G06Q 10/04 |
| 10,355,938 | B2 | * | 7/2019  | Saha ........................ H04W 24/08 |
| 2018/0315299 | A1 | * | 11/2018 | Subramanian ..... G06K 9/00771 |
| 2018/0315300 | A1 | * | 11/2018 | Subramanian ....... G06K 9/6278 |

\* cited by examiner

*Primary Examiner* — John A Tweel, Jr.
(74) *Attorney, Agent, or Firm* — Foley & Lardner LLP (57) ABSTRACT

An alarm management system includes a plurality of data sources configured to provide data relating to an event at a building and a processing circuit. The processing circuit is configured to receive the data from the data sources, apply a Bayesian network model to the data to generate a probability score for each of a plurality of possible causes of the event, identify the most probable cause of the event as a first cause of the plurality of possible causes having a highest probability score, execute an action with respect to the identified most probable cause of the event.

21 Claims, 8 Drawing Sheets

|   | Occupancy (Low/High) | Critical Asset (True/False) | Duration (Short/Moderate/Long) | External Door (True/False) | Access Event (True/False) | Probability of Careless Employee |
|---|---|---|---|---|---|---|
| 1. | Low (0.05) | False (0.03) | Short (0.01) | False (0.20) | False (0.01) | 0.30 |
| 1. | Low (0.05) | False (0.03) | Short (0.01) | True (0.10) | True (0.20) | 0.39 |
| 1. | Low (0.05) | False (0.03) | Short (0.01) | True (0.10) | False (0.01) | 0.20 |

Probability of Being Cause of DHO

| Input Data | INTRUDER | BENIGN | TAILGATE | CARELESS | HVAC | HVAC/WIND | POLITE |
|---|---|---|---|---|---|---|---|
| DFO Event (True) | 0.09 | - | - | - | - | - | - |
| Nearby Threats (True) | 0.10 | - | - | - | - | - | - |
| Occupancy (High) | 0.04 | 0.06 | - | 0.05 | 0.06 | - | - |
| Critical Asset (False) | 0.04 | 0.08 | - | 0.07 | - | - | - |
| Multiple Accesses (False) | - | - | 0.10 | - | - | - | - |
| Access Event (True) | - | 0.10 | - | 0.06 | - | - | - |
| Portal Door (False) | - | 0.10 | - | - | - | - | - |
| Duration (Long) | - | - | 0.07 | 0.06 | - | 0.02 | 0.50 |
| External Door (True) | - | - | - | 0.05 | 0.02 | - | - |
| Temperature (High) | - | - | - | - | 0.06 | - | - |
| Windy (False) | - | - | - | - | - | 0.08 | - |

BUILDING ALARM SYSTEM WITH BAYESIAN EVENT CLASSIFICATION

CROSS-REFERENCE TO RELATED APPLICATION

This application claims the benefit of and priority to U.S. Provisional Patent Application No. 62/752,686, filed Oct. 30, 2018, the entire disclosure of which is incorporated by reference herein.

BACKGROUND

The present disclosure relates generally to systems and methods for building access control and security systems, and more particularly to detection and analysis of various alarms in a building. In access control and security monitoring systems, events and alarms can be numerous and noisy. Most alarms do not represent genuine threats or require immediate follow up but are instead triggered by innocent and/or non-threatening causes. Thus, in a building with a high frequency of alarms, identifying genuinely serious security issues is difficult and time consuming, leading to inefficiency and artificially heightened general risk. Accordingly, systems and methods are needed for automatically identifying genuine security issues and other events that require prompt follow-up.

The present disclosure contemplates many types of alarms and events which may be of concern to an operator of a building access control and security system, including but not limited to door held open (DHO) alarms. DHO alarms (events) occur when a monitored door remains open for longer than a predefined duration. This time threshold is usually configured for each door, normally in the door controller firmware.

DHO alarms usually make up a substantial proportion of the total alarms occurring in a monitoring system. In larger systems, this can amount to thousands of daily DHO alarms. Understanding the context in which a DHO alarm occurs is essential for determining whether it represents a genuine security threat (for example, an intrusion). DHOs are often caused by hardware faults or by people holding doors open for colleagues. Such alarms create system noise that makes identifying real threats more difficult for operators. On the other hand, some DHOs may be indicators of more serious threats, such as intrusions. In other cases, DHOs may occur when people prop open doors to facilitate the bulk movement of people, goods, or furniture, for example during presentations, parties, or deliveries. This may or may not be viewed as a security concern, depending on the circumstances and the risk profile of the business or building. In any event, none of this contextual information is available to operators when they are making decisions about whether a DHO represents a threat.

Operators need to have knowledge and experience of the site in order to decide whether a DHO is a threat. Usually, operators adopt general rules to deal with this, such as only pursuing DHOs that are unresolved after a certain time, often several minutes. This creates a risk of genuine threats not being addressed in a timely fashion.

Attempts have been made to automate the management of alarms using 'hard-logic' based rules. An example of such a rule might be suppression of any DHO alarm occurring during office hours. Using rules in this manner does not scale to situations where there are many variables. For example, 1024 different rules would be needed to cover all possible outcomes from 10 binary variables.

Rules also create other problems. To define a rule, each variable must have a single threshold value (for example, if more than 5 access denied events occur in 10 minutes, alert an operator). It is often better to define a distribution of 'reasonable' values that a variable can take on and try to detect deviations from this.

Furthermore, if multiple rule templates are satisfied by some criteria, it will not be obvious which ones will be of most interest to operators because this cannot be measured: The rule is either broken, or it is not.

Finally, rules cannot be used for anomaly detection. By specifying a rule, one encodes the exact criteria needed to violate it and, as a result, it is only possible to detect exact breaks from defined patterns. There is no way to detect unusual or rare combinations of inputs.

Accordingly, various technical problems are prevalent in existing, rules-based approaches to alarm monitoring and management. As described in detail below, the systems and methods described herein solve these problems using a probabilistic approach for automatically identifying genuine security issues and other events that require prompt follow-up.

SUMMARY

One implementation of the present disclosure is an alarm management system. The alarm management system includes a plurality of data sources configured to provide data relating to an event at a building and a processing circuit. The processing circuit is configured to receive the data from the data sources, apply a Bayesian network model to the data to generate a probability score for each of a plurality of possible causes of the event, identify the most probable cause of the event as a first cause of the plurality of possible causes having a highest probability score, execute an action with respect to the identified most probable cause of the event.

In some embodiments, the processing circuit is further configured to determine whether the first cause is in a set of pre-selected causes for which an alert is to be generated, and in response to determining that the first cause is in the set of pre-selected causes, generate a graphical user interface that identifies the event and the first cause. The processing circuit may be further configured to refrain from generating the graphical user interface.

In some embodiments, the processing circuit is configured to execute the action by controlling one or more alarm devices located in or around the building to act in response to the identified most probable cause. The one or more alarm devices may be configured to deter the identified most probable cause.

In some embodiments, the plurality of data sources include an HVAC system and a weather station. In some embodiments, the plurality of data sources include occupancy sensors and a building access system.

Another implementation of the present disclosure is one or more non-transitory computer-readable media storing program instructions that, when executed by a processor, cause the processor to perform operations. The operations include identifying an occurrence of an event, receiving data from a plurality of data sources, applying a Bayesian network model to the data to generate a probability score for each of a plurality of possible causes of the event, identifying the most probable cause of the event as a first cause of the plurality of possible causes having a highest probability score, and executing an action with respect to the identified most probable cause of the event.

In some embodiments, the operations include determining whether the first cause is in a set of pre-selected causes for which an alert is to be generated, and, in response to determining that the first cause is in the set of pre-selected causes, generating a graphical user interface that identifies the event and the first cause. The operations may include refraining from generating the graphical user interface in response to determining that the first cause is not in the set of pre-selected selected causes.

In some embodiments, executing the action includes controlling one or more alarm devices located in or around the building to act in response to the identified most probable cause. Controlling the one or more alarm devices includes determining an action of the one or more alarm devices configured to deter or mitigate the identified most probable cause and controlling the one or more alarm devices to perform the action.

In some embodiments, the plurality of data sources comprise two or more of HVAC equipment, a weather station, a social media platform, a scheduling system, an occupancy sensor, a lighting system, an access system, and a security system. In some embodiments, identifying the occurrence of the event comprises receiving a door-held-open alarm from a door security device.

Another implementation of the present disclosure is a method. The method includes receiving data from a plurality of data sources, applying a Bayesian network model to the data to generate a probability score for each of a plurality of possible causes of an event, identifying the most probable cause of the event as a first cause of the plurality of possible causes having a highest probability score, and executing an action with respect to the identified most probable cause of the event.

In some embodiments, executing the action includes determining whether the first cause is in a set of pre-selected causes for which an alert is to be generated, generating a graphical user interface that identifies the event and the first cause in response to determining that the first cause is in the set of pre-selected causes, and refraining from generating the graphical user interface in response to determining that the first cause is not in the set of pre-selected causes.

In some embodiments, executing the action includes identifying one or more alarm devices associated with the identified most probable cause of the event and controlling the one or more alarm devices to act in response to the identified most probable cause. Controlling the one or more alarm devices may include mitigating or deterring the identified most probable cause.

In some embodiments, the plurality of data sources include two or more of HVAC equipment, a weather station, a social media platform, a scheduling system, an occupancy sensor, a lighting system, an access system, and a security system. In some embodiments, the event is a door-held-open alarm and the plurality of possible causes include tailgating, airflow, and intrusion.

DETAILED DESCRIPTION

Referring generally to the Figures, systems and methods for alarm classification using Bayesian analysis to automatically identify the most probable root cause(s) of an alarm or event using multiple data sources are shown, according to exemplary embodiments. As described in detail below, the systems and method described herein utilize a learning probabilistic model to automatically discover the most likely causes of events and alarms. Although the examples described herein make reference to door held open (DHO) alarms, the systems and methods described herein may be implement for various types of building alarms.

In the systems and methods described herein, access control and security monitoring system data, together with other sources of data (e.g., third party data, environmental/weather data, social media data) may be gathered and analyzed. A Bayesian network may be constructed to infer, from data patterns, the most probable cause of an alarm. Depending on the classification of the cause (for example, intruder, tailgating, etc. as described below), the alarm may be highlighted, suppressed, further processed to gain other insights, or may cause a new event to be generated (for example, a door repair alert).

In some embodiments, the Bayesian network model works, initially, on a set of assumptions about the likely cause of a DHO, based on operator experience. For example, an operator knows that a DHO is more likely to be of interest if it is preceded by a DFO, occurs on a critical door, there are fewer people around, or the alarm has not resolved by a certain time. Rules based on these known patterns may be represented in the Bayesian network as nodes contributing to joint probability calculations that score associated target nodes (categories of DHO cause). Data patterns that satisfy a rule may be ingested to the model, for example a DFO occurring shortly before a DHO; a DHO of a certain, minimum duration; and/or a DHO on a critical door (for example, a perimeter door), where occupancy is low, and DHO duration is above a certain threshold.

In some embodiments, the Bayesian model is initially trained on system data. Some of the data may be binary, with associated probability scores attached to each state. Some of the data, such as the duration of a DHO, may be pre-processed and pre-classified. For example, DHO duration may be ranked as being 'short', 'moderate', or 'long', and each ranking may be given a probability score for the Bayesian model. DHO duration may be analyzed using anomaly detection approaches known in the art, such as a Boxplot test, a Modified Standard Score test, or some other method appropriate to the size and distribution of the data. Once trained using the initial rules, the model may also be updated and improved with new rules for data patterns that may identify additional DHO causes and contributory factors using, for example, feature engineering techniques.

The systems and methods described herein present various advantages over other, rules-based approaches. For example, the systems and methods disclosed herein treat some variables as independent of each other, thereby requiring fewer defined relationships to be created in order to manage at least the same degree of complexity as a rules-based method. In other words, by recognizing that not every variable has an impact on every other variable (for example, the wind speed outside the building is not affected by the number of people inside the building), the number of relationships that must be defined is reduced. As a result, the model can capture complex data patterns (in a similar way to rules) but at a fraction of the computational cost of a rules-based approach. The model is also probabilistic (unlike a rules system) allowing it more flexibility in categorizing root causes and lending itself more easily to anomaly detection, testing, and improvement. That is, because the Bayesian networks utilized herein are probabilistic, the expected ranges of behavior (based on prior knowledge) can be specified and tested against how the data actually behaves, allowing the model to rank root causes in order of likelihood and detect anomalous combinations of inputs. The accuracy of the classification may thereby be improved through training over time.

Figure 1:
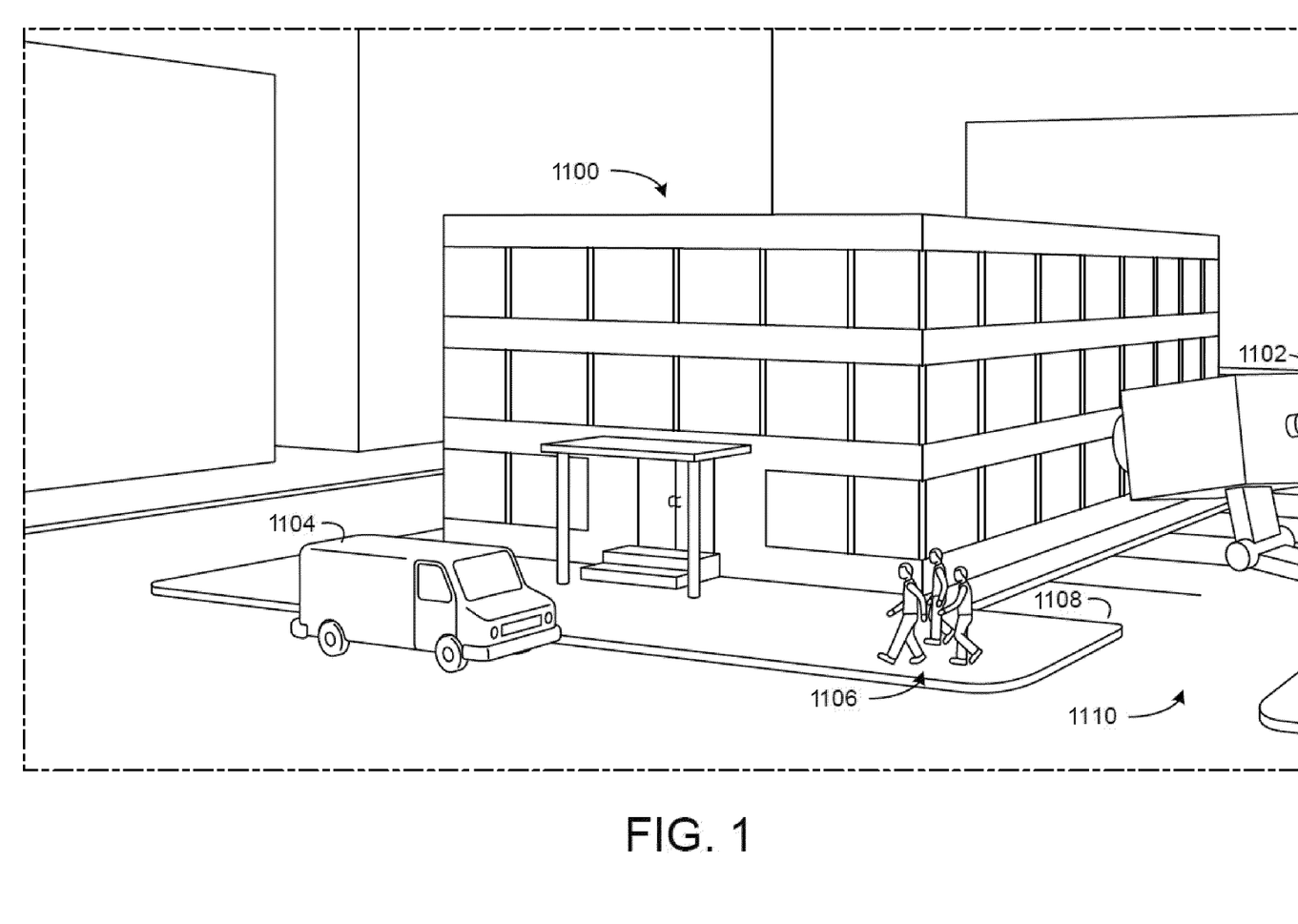
FIG. 1 is an illustration of a building with an access control and security system, according to an exemplary embodiment.

Referring now to FIG. 1, a building 1100 with a security camera 1102 and a parking lot 1110 is shown, according to an exemplary embodiment. The building 1100 is a multi-story commercial building surrounded by the parking lot 1110 but can be any type of building in some embodiments. The building 1100 may be a school, a hospital, a place of business, a residence, an apartment complex, etc. The building 1100 may be associated with the parking lot 1110. The building 1100 may be equipped with an access control system, security system, HVAC system, building management system, etc., for example as described in detail below. In particular, the building 1100 may be provided with the alarm management system 300 shown in FIGS. 2-3 and described in detail with reference thereto.

Both the building 1100 and the parking lot 1110 are at least partially in the field of view of the security camera 1102. In some embodiments, multiple security cameras 1102 may be used to capture the entire building 1100 and parking lot 1110 not in (or in to create multiple angles of overlapping or the same field of view) the field of view of a single security camera 1102. Additional security cameras 1102 may be located within the building 1100. The parking lot 1110 may be used by one or more vehicles 1104 where the vehicles 1104 may be either stationary or moving (e.g. delivery vehicles). The building 1100 and parking lot 1110 may be further used by one or more pedestrians 1106 who can traverse the parking lot 1110 and/or enter and/or exit the building 1100. The building 1100 may be further surrounded by a sidewalk 1108 to facilitate the foot traffic of one or more pedestrians 1106, facilitate deliveries, etc. In other embodiments, the building 1100 may be one of many buildings belonging to a single industrial park or commercial park having a common parking lot and security camera 1102. In another embodiment, the building 1100 may be a residential building or multiple residential buildings that share a common roadway or parking lot.

In some embodiments, various additional devices of security equipment are included with the building 1100. For example, one or more doors of the building may include door sensors configured to detect opening and closing of a corresponding door, including to determine a duration of time over which a door is held open. The building 1100 may also include an access control system configured to monitor and/or restrict access to the building 1100 and/or various areas therein, for example by controlling locks on various doors, gates, elevators, etc. in the building 1100. The access control system may receive an indication of an identity of an occupant (e.g., via identification badge, RFID signal, password/pin input, facial recognition, etc.), determine access rights for the identified occupant, and open and/or lock various doors in response. As another example, the building 1100 may include various security systems and sensors configured to detect indications of forced access to the building 1100, including broken windows, forced-open doors, etc.

As another example, the building 1100 may be served by an HVAC system operable to affect airflow and temperature in the building 1100. The HVAC system may include various sensors, including temperature sensors, humidity sensors, occupancy sensors, etc. In some embodiments, the building 1100 may include a weather station configured to measure environmental conditions around the building (e.g., wind speed, wind direction, temperature). Various additional examples are described below with reference to FIG. 2.

Figure 2:
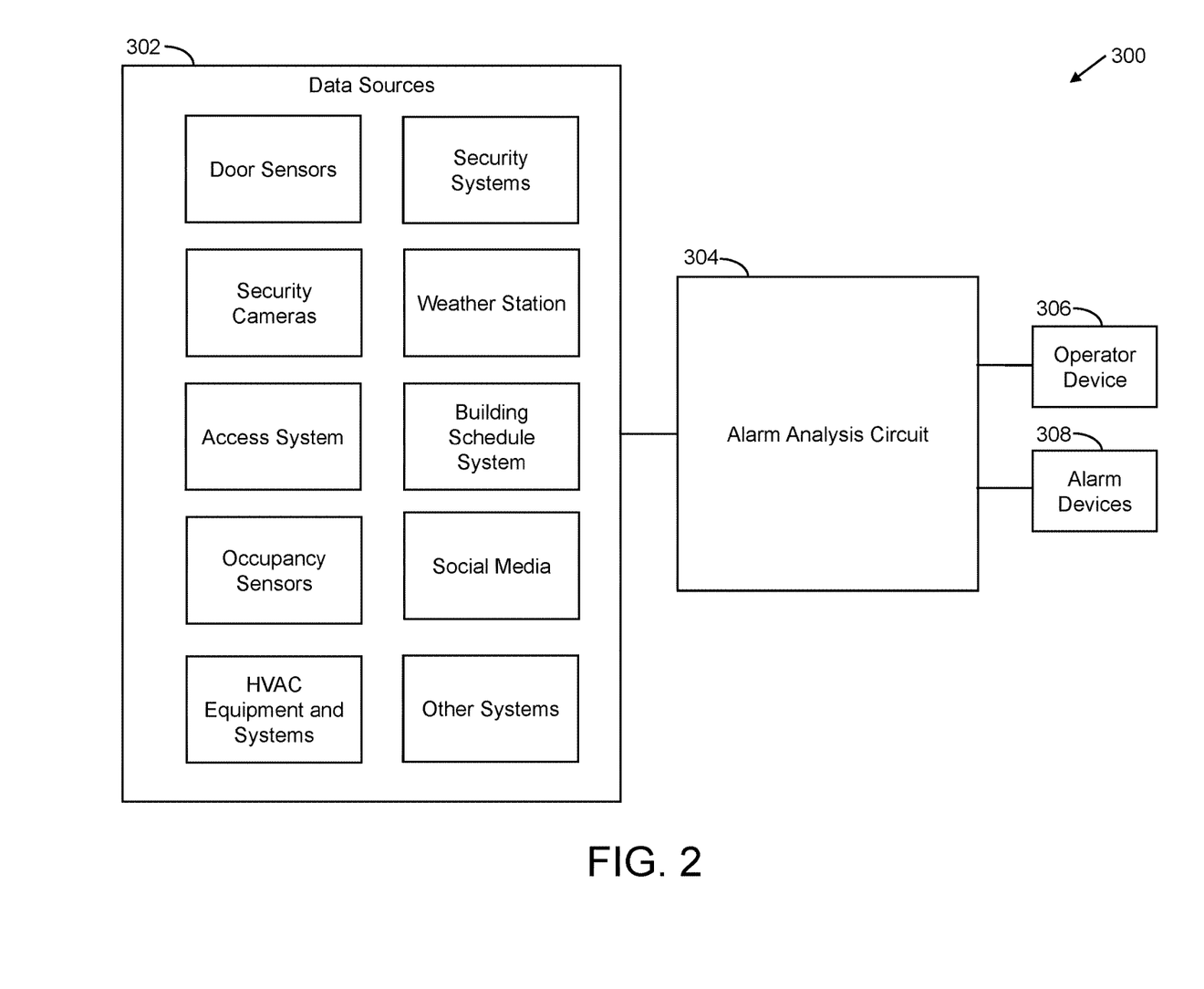
FIG. 2 is a first block diagram of an alarm management system, according to an exemplary embodiment.

Referring now to FIG. 2, a block diagram of an alarm management system 300 is shown, according to an exemplary embodiment. The alarm management system 300 includes various data sources 302, an alarm analysis circuit 304, one or more operator device(s) 306, and various alarm devices 308, all communicably and operably coupled to one another. The alarm management system 300 is configured to measure, generate, and receive various data relating to the building (including data indicative of one or more events), apply the data in a Bayesian network model to determine the relative probability of various possible causes of an event (e.g., a DHO event), and provide a graphical user interface to an operator that identifies the most probable cause(s) of an event. The alarm management system 300 may also be configured to cause the alarm devices 308 to provide one or more alarms (e.g., audible alerts, strobe lights, door lockdowns, etc.) in the building 1100 in response to determining that a particular type of cause is the most probable cause of the event (e.g., a high-risk cause such as an intruder). These and other features are described in detail below.

The alarm analysis circuit 304 may be implemented locally at a building, may be provided locally at the operator device 306, and/or provided remote from the building, for example via a cloud-based computing resource communicable via a communications network (e.g., Internet, intranet). While the examples herein refer to a building, the alarm analysis circuit 304 may also be configured to serve multiple buildings, for example a campus, real estate portfolio, or other collection of spaces.

The data sources 302 may include various devices, systems, databases, platforms, equipment, sensors, etc. configured to provide data relating to the building 1100. As shown in FIG. 1, the data sources 302 may include, but are not limited to, door sensors, security cameras, access systems, occupancy sensors, HVAC equipment and systems, security systems, weather stations, building schedule systems (e.g., calendaring systems), social media, and various other sources of data relating to a building. The data sources 302 are communicable with the alarm analysis circuit 304 to provide the data relating to the building to the alarm analysis circuit 304. It should be understood that more or less types of data sources 302 and more or less points associated with such data sources 302 may be included in various embodiments.

Door sensors may be configured to detect opening and closing of doors in the building. Accordingly, the door sensors may be configured to facilitate determination of a duration of time for a which a door is open. The door sensors may also be configured to detect when a door is forced open (i.e., as opposed to authorized opening of the door). The door sensors may thereby be configured to provide various data relating to the opening and closing of doors in the building 1100 to the alarm analysis circuit.

Security cameras may be configured to collect video data of the building 1100. Security cameras may be arranged to provide views of various areas of the building 1100, for example including areas showing doors in the building 1100.

An access system may be configured to manage access of various individual to various areas of the building 1100. The access system is configured to provide data relating to authorized access to one or more doors in the building 1100.

The occupancy sensors may be configured to determine a number of occupants in various building zones (e.g., rooms, hallways, etc.) in the building 1100 and/or the presence/absence of occupants in a building zone. Accordingly, the occupancy sensors may provide occupancy data to the alarm analysis circuit 304. In various embodiments, the occupancy sensors may be associated with an HVAC system, a lighting system, a security system, a unified building management system, etc.

HVAC equipment and systems may be configured to manage temperature, airflow, and various other environmental conditions of the building equipment. The HVAC equipment and systems may provide data relating to airflow, temperature, equipment status, occupancy, etc. to the alarm analysis circuit 304.

Security systems may be configured to monitor and detect unauthorized or forced entry to the building 1100 and/or building zones therein. For example, security systems may include sensors configured to detect when a window or door is broken. Security systems may also include gun-shot detection and localization systems and/or other threat detection systems.

A weather station may be configured to measure environmental conditions outside of a building. For example, the weather station may be configured to measure wind speed, wind direction, temperature, humidity, precipitation, solar radiance, etc. The weather station may include various sensors in one location and/or various sensors positioned in various positions relative to the building 1100. The weather station may thereby provide data relating to weather conditions around the building 1100 to the alarm analysis circuit 304. In some embodiments, an internet-based source of local weather information is used instead of or in addition to the weather station.

A building schedule system may be configured to facilitate organization and management of various uses of various spaces of a building, for example meeting room reservations, hotel room bookings, patient room bookings, operating rooms schedules, maintenance schedules, etc. The building schedule system may thereby provide data relating to when various spaces may be entered/exited, occupied/unoccupied, etc. to the alarm analysis circuit 304.

Social media platforms may be configured to provide various additional information relating to utilization of the building 1100 by occupants. For example, occupants may provide information on a social media platform relating to a special event (e.g., meeting, presentation, party) in a building. As another example, occupants may post information indicating that a building may be unoccupied (e.g., posts relating to a vacation, photos from another location, etc.). Accordingly, various information and data from various social media platforms may be provided to the alarm analysis circuit 304.

Various other systems and data sources may also be included in the alarm management system 300. For example, fire systems, elevator systems, parking lot systems, event ticketing systems, point of sale systems, etc. may be included to provide data relating to a building and behavior of occupants therein.

Although described herein as various discrete systems, in some embodiments various types of data sources may be included in a unified building management system to facilitate seamless transfer and processing data across various sensors, devices, controllers, circuits, etc.

The alarm analysis circuit 304 is configured to receive data relating to the building from the data sources 302, determine an occurrence of an event based on the data, apply a Bayesian network model to determine the relative probability of various possible causes of the event, identify one or more most probable causes of the event, and generate a graphical user interface that provides an indication of the identified one or more most probable causes to an operator via an operator device 306. The alarm analysis circuit 304 may also be configured to cause one or more alarm devices 308 to operate to generate sound, light, and/or otherwise affect conditions or access in the building 1100 in response to determine of a probable cause of an event. The alarm analysis circuit 304 is shown in detail in FIG. 3 and described in detail with reference thereto.

The operator device 306 is configured to display a graphical user interface to an operator of the alarm management system 300, for example a security officer or building manager. The operator device 306 may include a desktop computer, a television monitor, a laptop computer, a tablet, a smartphone, a virtual reality headset, and/or an augmented reality headset, among other possibilities. The operator device 306 is communicably and operably coupled to the alarm analysis circuit 304, for example via an intranet and/or via the Internet.

The alarm devices 308 may include various audible alarm speakers, strobe lights, signs, etc. located in and/or around the building 1100 and configured to provide a warning of an event to occupants of the building. In some embodiments, the alarm device 308 may include user devices (e.g., smartphones) associated with occupants of a building. In such a case, the alarm analysis circuit may push notifications to the various smartphones when a particular high-risk cause (e.g., intruder, active shooter) of an event is determined to be the most probable cause. In some embodiments, the alarm devices 308 include various access control devices (e.g., locks, fire doors, etc.) that may be controlled by the alarm analysis circuit 310 to contain the cause of an event and/or facilitate safety and security of building occupants and/or valuable items or information in a building.

Figure 3:
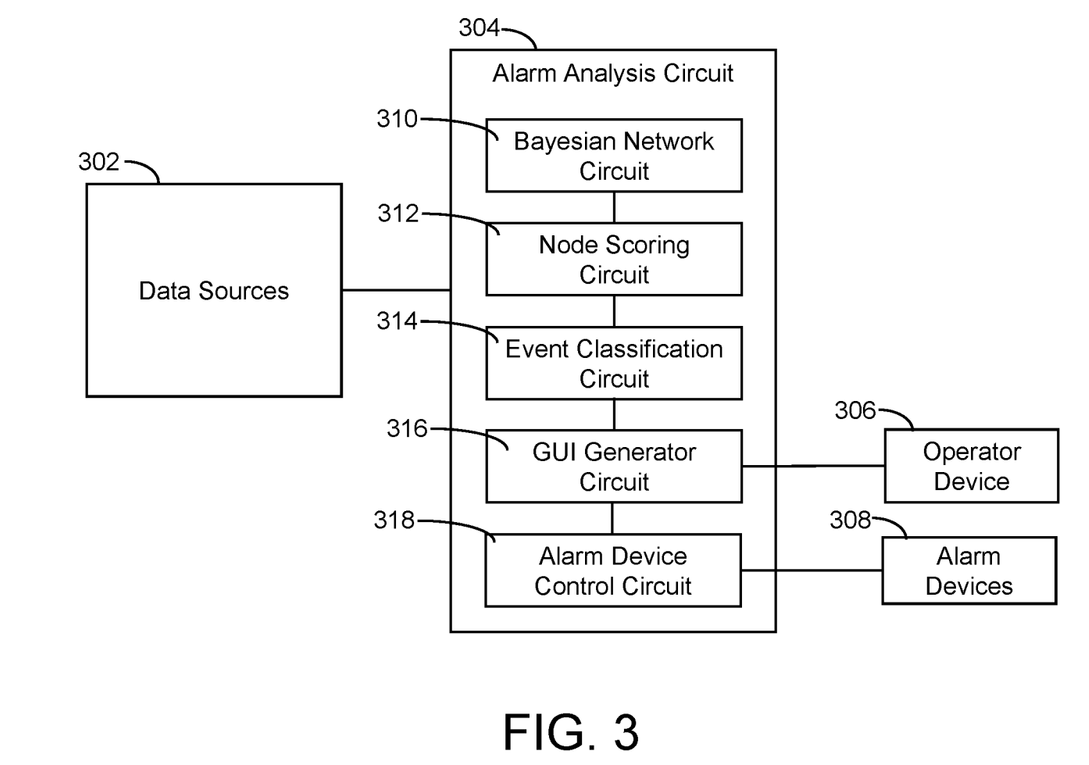
FIG. 3 is a second block diagram of the alarm management system of FIG. 2, according to an exemplary embodiment.

Referring now to FIG. 3, a second view of the alarm management system 300 is shown with a detailed view of the alarm analysis circuit 304, according to an exemplary embodiment. As shown in FIG. 3, the alarm analysis circuit includes a Bayesian network circuit 310, a node scoring circuit 312, an event classification circuit 314, a graphical user interface (GUI) generator circuit 316, and an alarm device control circuit 318. The alarm analysis circuit 304 is described herein using the example of DHO events, with reference to an example Bayesian network model 400 shown in FIG. 4 and example probability data shown in tables in FIGS. 5-7. It should be understood that the DHO examples are included as illustrative examples and that the present disclosure contemplates implementation for classification of various types of building events and alarms.

The Bayesian network circuit 310 is configured to store a Bayesian network model configured to facilitate cause identification for events in the building. The Bayesian network circuit 310 is also configured to facilitate creation, training, and updating of the Bayesian network model. The Bayesian network model maps relationships between a set of possible causes of a building event and various system data that contributes jointly to a probability calculation for each possible cause.

Figure 4:
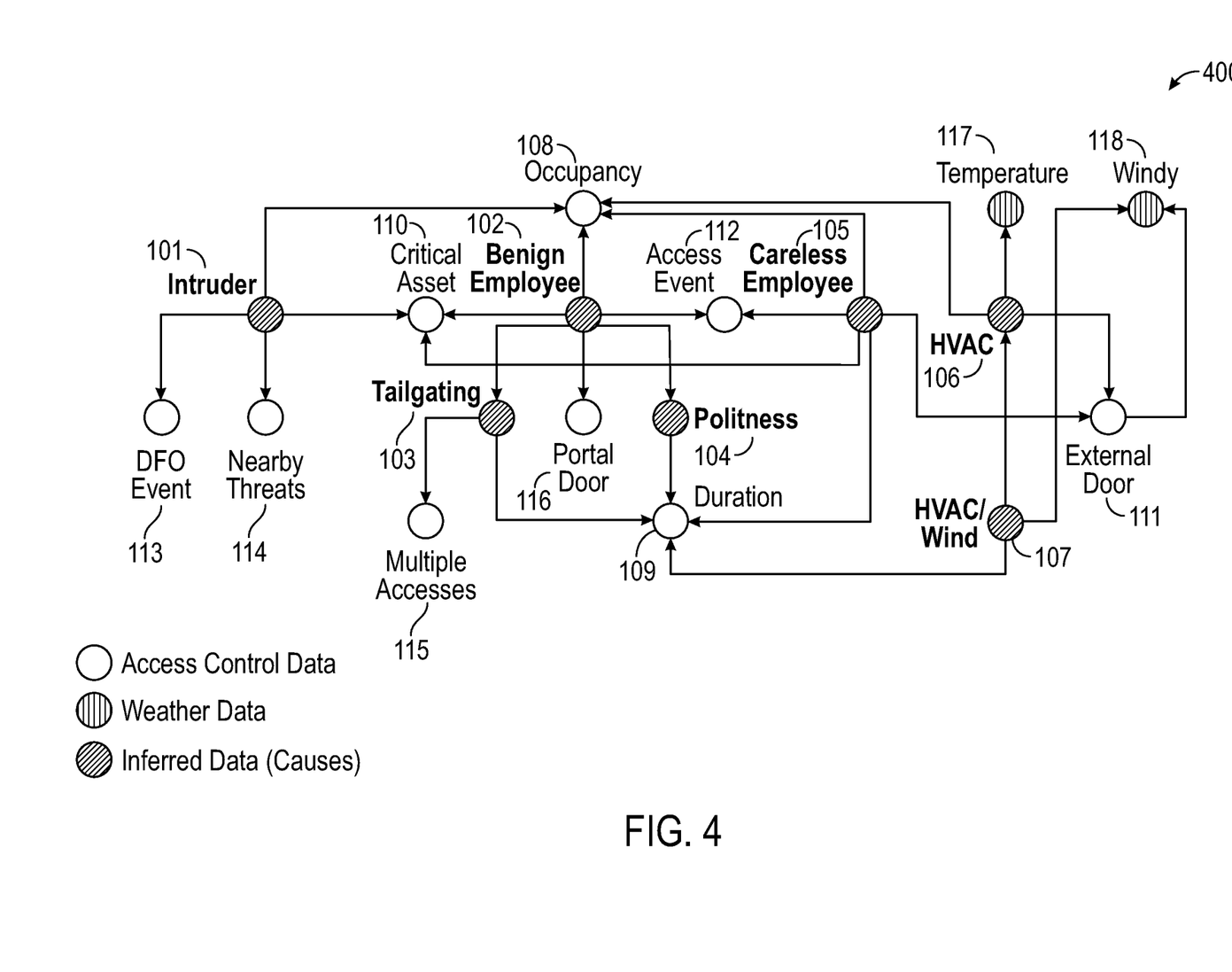
FIG. 4 is an illustration of a Bayesian network model for management of door-held-open alarms, according to an exemplary embodiment.

An example of a Bayesian network model 400 for a DHO event is shown in FIG. 4, according to an exemplary embodiment. As shown in FIG. 4, a plurality of nodes is linked in a network. Each node represents a possible cause or a type of data contributing to a probability calculation of each possible cause linked to that node. As shown in FIG. 4, the open circles (black outline with white center) indicate system data nodes, the solid black circles indicate environmental data nodes, while the circles shown with a black-to-white fading pattern indicate possible cause nodes. Arrows between the nodes indicate the probability relationships between the various possible causes and the various data. In particular, the Bayesian network model 400 includes a node for each of the following:

| Node name | Description |
| --- | --- |
| ACCESS EVENT | Whether the DHO was preceded by an event granting access or not, for example, where a person uses a valid access card. |
| BENIGN EMPLOYEE | Whether the DHO was caused by a benign employee or not. A benign employee is someone who mostly uses building systems in a normal or expected manner. |
| CARELESS EMPLOYEE | Whether the DHO was caused by a careless employee or not. A careless employee is someone who may tend to use building systems in a risky or unexpected manner, such as propping doors open, taping over locks to avoid having to use their access card, and so on. |
| CRITICAL ASSET | Whether the asset affected by the DHO is critical infrastructure or not, for example a server or control room. |
| DFO EVENT | Whether the DHO was preceded by a DFO event or not. A DFO may indicate that a door has been forced open, possibly by an intruder. |
| DURATION | The duration of the DHO. Duration may indicate the cause of a DHO. Short DHOs may be caused by users holding doors for others. Long DHOs may indicate things like tailgating or careless employees propping open doors. |
| EXTERNAL DOOR | Whether the asset affected by the DHO is external or not. External doors are more susceptible to the effects of wind. |
| HVAC | Whether the DHO was caused by the HVAC system or not. HVAC systems may cause air changes that can delay the closing of a door. |
| HVAC/WIND | Whether the DHO was caused by the HVAC system or wind speeds, or not. Wind speeds may affect the behavior of a HVAC system and may, in particular, affect external doors and cause them to close more slowly. |
| INTRUDER | Whether the DHO was caused by an intruder or not. |
| MULTIPLE ACCESSES | Whether multiple accesses have occurred while the DHO has been active. Multiple accesses might indicate that the door is being held open while multiple users file through. |
| NEARBY THREATS | Whether there have been threats recorded nearby the asset affected by the DHO. Nearby threats increase the probability that a DHO has a suspicious cause. Glass break or motion detection alarms in the area increase the likelihood that an intruder caused the DHO. |
| OCCUPANCY | The occupancy of the building. Intruders are less likely during times of high occupancy. On the other hand, issues like tailgating are more likely during those times. Intruders are more likely during times of low occupancy. |
| POLITENESS | Whether the DHO was caused by an employee holding a door for a colleague or not. |
| PORTAL DOOR | Whether the door is a portal or main artery door or not. Portal doors tend to be internal (lower risk), are subject to heavy use, and so are more likely to generate DHOs caused by tailgating, door holding for colleagues, and other less serious activities. |
| TAILGATING | Whether the DHO was caused by tailgating or not. Tailgating happens when a person, without using their access credentials, uses an entrance that is open because another person has presented their credentials. This is common and usually due to people being polite to others entering the same area. |
| TEMPERATURE | The temperature outside the building. External temperatures affect the behavior of HVAC systems. |
| WINDY | Whether the wind speeds are high or not. High winds can affect HVAC systems and external doors. |

In this example, the Bayesian network model 400 is designed to calculate the probability that a DHO was caused by one of the following possible causes: an intruder, the activities of a benign employee (i.e., authorized building occupant), tailgating, employees holding a door open out of politeness, the activities of a careless employee, the effects of a HVAC system on the door, and the effects of HVAC or wind on the door. Accordingly, the intruder node 101, the benign employee node 102, the tailgating node 103, the politeness node 104, the careless employee node 105, the HVAC node 106, and the HVAC/wind node 107 are possible cause nodes associated with possible causes of a DHO event. The DFO event node 113, the nearby threats node 114, the critical asset node 110, the multiple accesses node 115, the portal door node 116, the occupancy node 108, the access event node 112, the duration node 109, the external door node 111, the temperature node 117, and the windy node 118 are data nodes associated with data whose value affects the probability of the various possible causes based on the relationships indicated by the arrows in the model 400.

The Bayesian network model 400 provided by the Bayesian network circuit 310 thereby models probability relationships between the possible causes and building, environmental, or other data. For example, in calculating the likelihood that a DHO was caused by a careless employee (node 105), the model in this example looks at the following factors: the occupancy of the building at the time (node 108), the duration of the DHO (node 109), whether the door secures a critical asset (node 110), whether the door is an external door (node 111), and whether the DHO was preceded by an access granted event (node 112). Each of these factors is represented as a node connected to the careless employee node 105, with a probability score that, given the value of its data, the DHO was caused by a careless employee.

Figure 5:
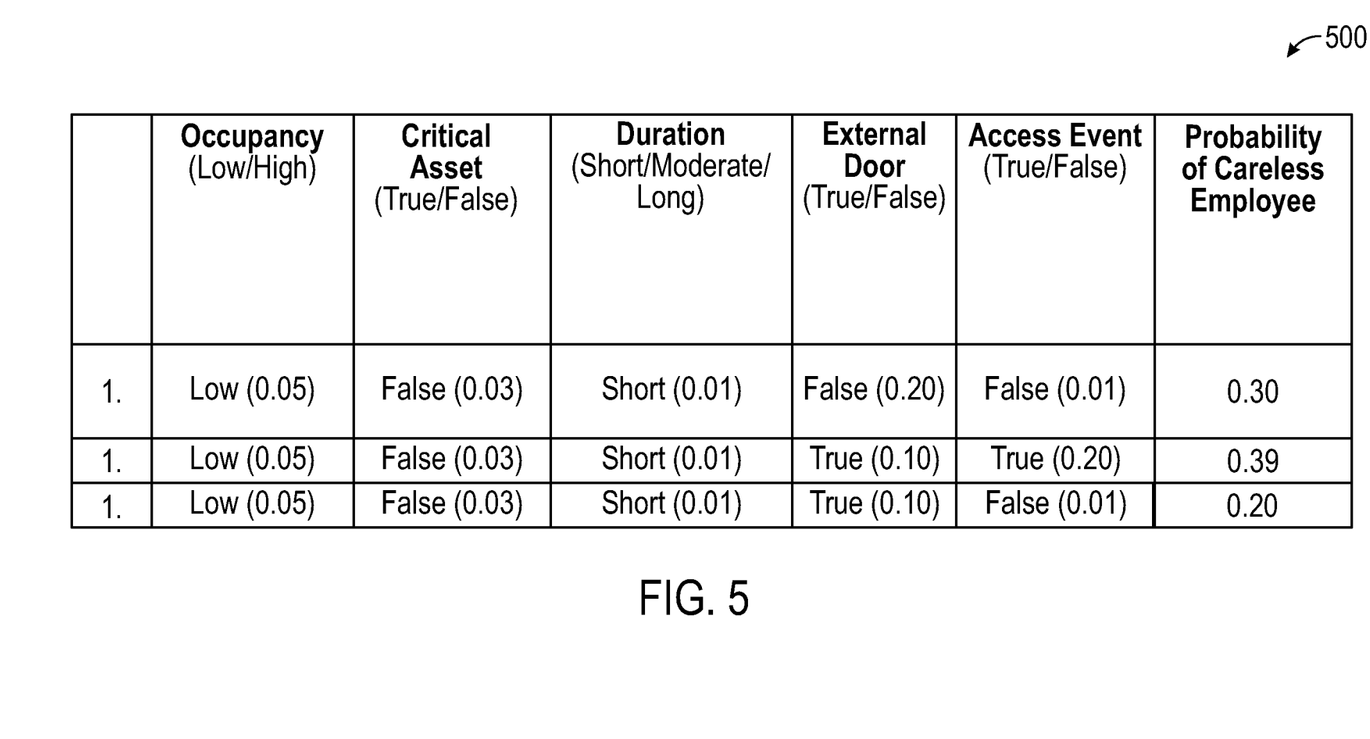
FIG. 5 is a first table of example probabilities associated with the Bayesian network model of FIG. 4, according to an exemplary embodiment.

As part of the Bayesian network model 400, the Bayesian network circuit 310 stores a probability contribution for each possible value of each data node to each of the linked possible causes. FIG. 5 shows a table 500 including three hypothetical DHO events and the probability that each was caused by the behavior of a careless employee. As indicated in the top row of the table, each data node may be characterized as a binary (e.g., true/false, low/high) or other discrete characteristic (e.g., short/moderate/long). Mapping of raw building data (e.g., duration in seconds) to this discrete characterization (e.g., short/moderate/long) may be based on predefined relationships and/or definitions learned by the Bayesian network circuit 310 during training of the model.

As illustrated by the table 500 in FIG. 5, the Bayesian network circuit 310 is configured to calculate a probability value for a possible cause as a sum of the probability contributions of the various data nodes linked to that possible cause. For example, as shown in the table 500 of FIG. 5, the Bayesian network circuit 310 may associate a low occupancy with an increase of 0.05 in the probability that the DHO event was caused by a careless employee. Other such values for critical asset, duration, external door, and access event data are shown in the table 500. These values may then be summed to determine a total probability that the DHO event was caused by a careless employee.

Figure 6:
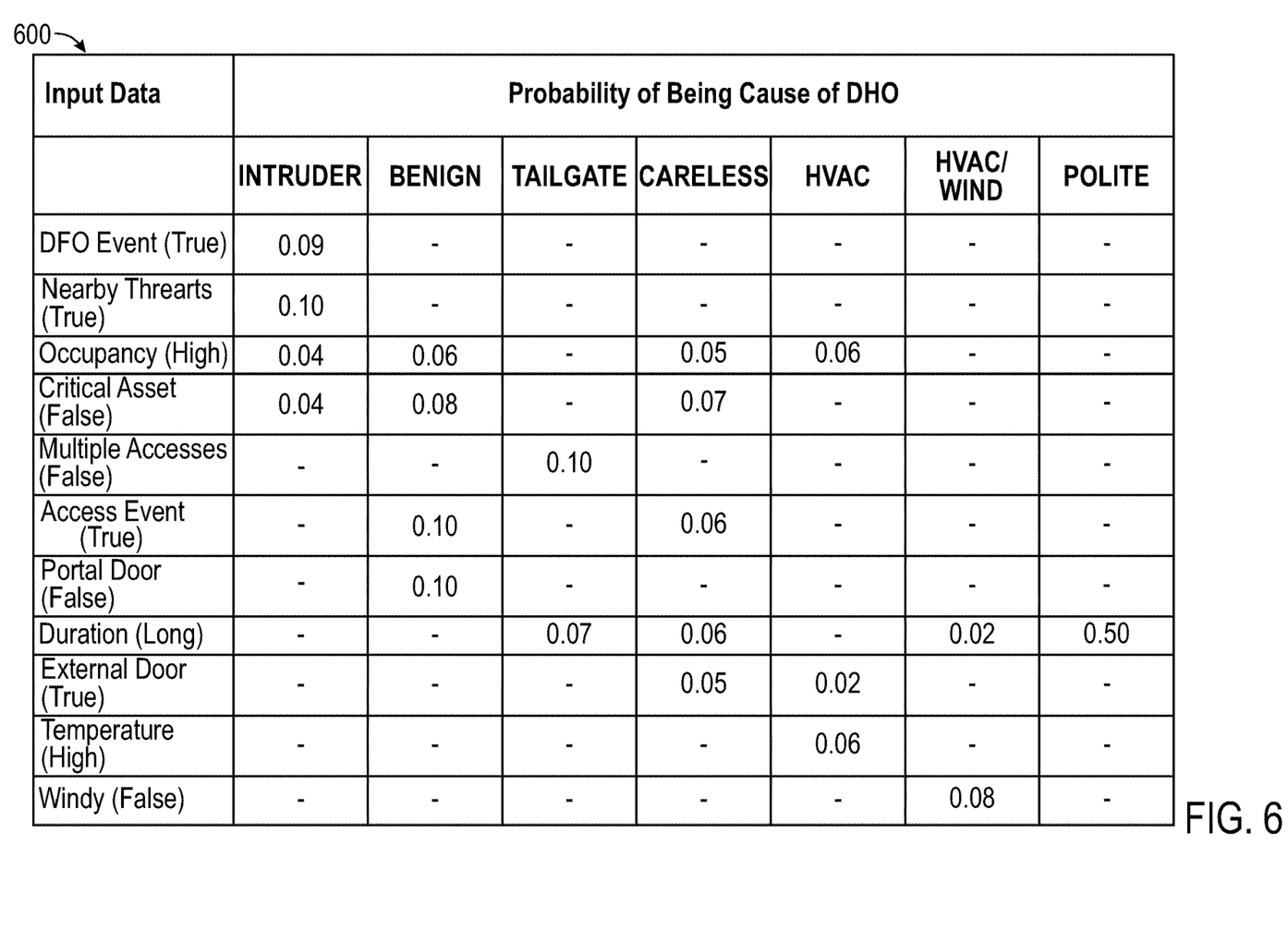
FIG. 6 is a second table of example probabilities associated with the Bayesian network model of FIG. 4, according to an exemplary embodiment.

Accordingly, the Bayesian network circuit 310 is configured to store a collection of probability contributions for the various relationships shown in the Bayesian network model 400 of FIG. 4. FIG. 6 shows a table 600 including a collection of example probability contributions for various data. In some embodiments, initial probability values are input as a starting point for model training. The model may be then be trained on real data and/or simulated data to better tune the model to match real-world system behavior without requiring pre-established knowledge of all interrelationships between nodes. The Bayesian network circuit 310 is configured to facilitate such machine learning both at an installation/implementation stage of the operation of the alarm management system 300 and during on-line operation of the alarm management system 300.

The node scoring circuit 312 is configured to receive data from the data sources 302 and the Bayesian model from the Bayesian network circuit 310 and apply the Bayesian model to the data to generate a probability score for each of the possible causes. The node scoring circuit 312 may initiate generation of probability scores in response to detection of an event at the building, for example a DHO event.

Figure 7:
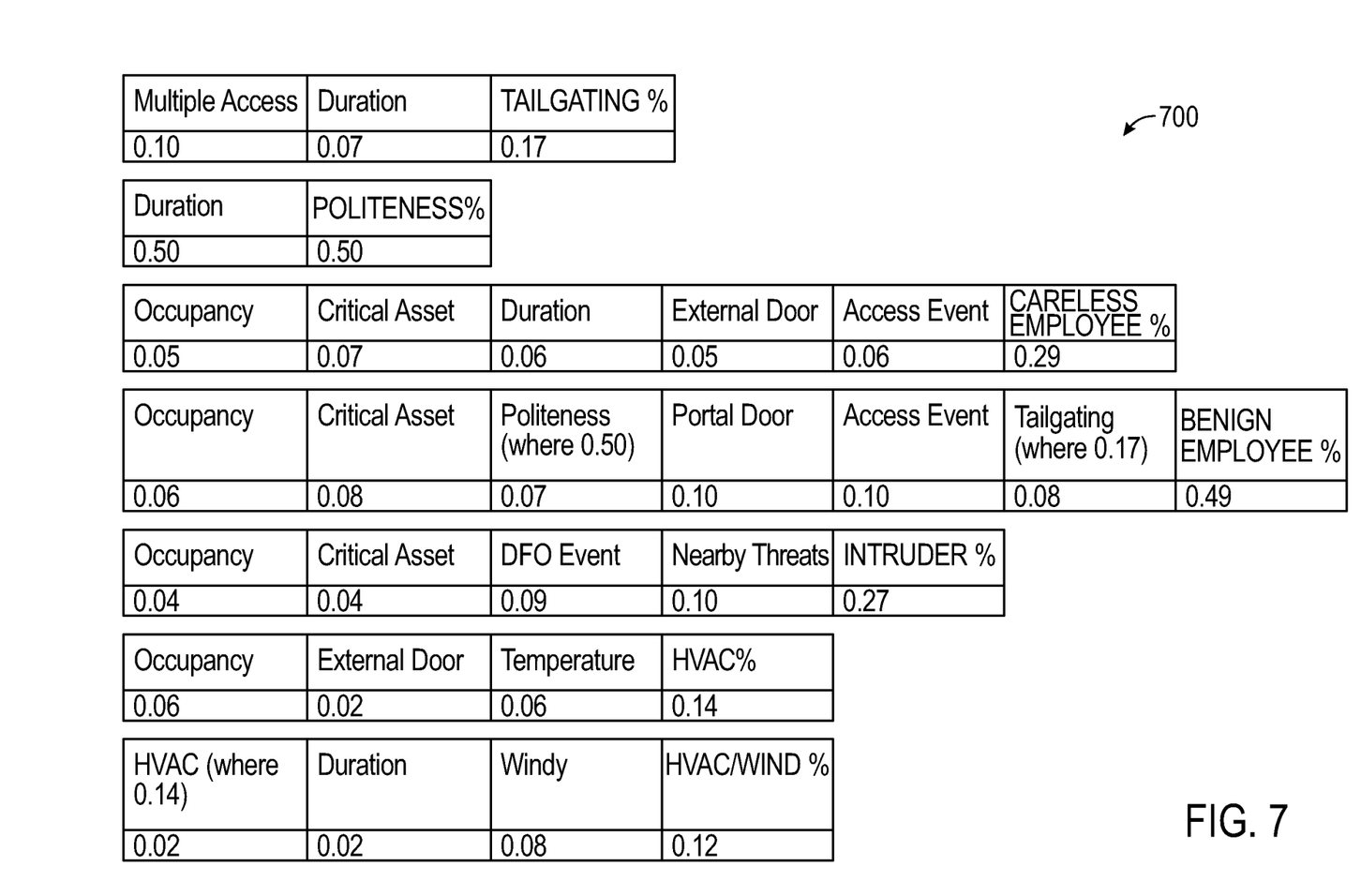
FIG. 7 is a set of tables illustrating alarm classification using the Bayesian network model of FIG. 4, according to an exemplary embodiment.

The node scoring circuit 312 first processes the data from the data sources 302 to characterize the data into discrete categories, e.g., as low or high, as true or false, etc. to select the probability contributions as shown on the table 600 in FIG. 6. The node scoring circuit 312 then calculates a probability score for each of the possible causes by summing up the various probability contributions associated with the corresponding possible cause. FIG. 7 shows a set of tables 700 for an example DHO event. The right-most column in each table of the set of tables 700 shows the probability that the corresponding cause was the cause of the DHO event (i.e., the probability score for that cause), while each of the other columns corresponds to a data node linked to the corresponding possible cause node in the Bayesian network model 400.

The event classification circuit 314 is configured to receive the probability scores (i.e., the values in the right-most columns of the set of tables 700) from the node scoring circuit 312 and compare the probability scores. The event classification circuit 314 selects the possible cause with the highest probability score as the most probable cause of the event. In the example of FIG. 7, the event classification circuit 314 selects politeness as the most probable cause of the event, i.e., that an employee politely held the door open for a colleague to cause the DHO event. The event classification circuit 314 may also rank the remaining possible causes in order of probability score in order to characterize the relative probability of the possible causes. The event classification circuit 314 classifies the event as associated with the most probable cause of the event. In some cases, the event classification circuit 314 is configured to apply tie-breaker logic in a case where two or more possible causes have equal probability scores. In some embodiments, a tie between two or more equal probability scores triggers further machine learning for the Bayesian model.

The GUI generator circuit 316 is configured to generate a graphical user interface (GUI) that includes an indication of the event and the most probable cause(s) of the event. The GUI generator circuit 316 is configured to provide the GUI to the operator device 306. The GUI may provide a list of multiple events ranked by the seriousness of the most probable cause of the event (e.g., intruder-caused events positioned higher than benign-employee-caused events). In some embodiments, the GUI generator circuit 316 may be configured to only generate the graphical user interface if the most probable cause of an event is among a subset of one or more serious causes (e.g., intruder-caused events), while refraining from generating a GUI for less-serious causes (e.g., politeness-caused events). For example, a preselected set of causes for which alarms or notifications should be generated may be stored, and the GUI may be generated in response to a determination that the most probable cause is in the preselected set of causes. In some embodiments, the preselected set can be customized by a user via the GUI. The GUI generator circuit 316 may thereby be configured to draw attention to events with certain most probable causes while hiding or minimizing alerts/alarms relating to events with other most probable causes. The alarm management system 300 thereby facilitates an operator in sorting through the noise created a large number of events.

The alarm device control circuit 318 is configured to control one or more alarm devices 308 positioned in or around the building 1100. In some cases, an automated action of one or more alarm devices 308 may be desired in response to determination of a particular most probable cause. For example, in a case where an intruder is the most probable cause of a DHO event, it may be desirable to have audible alarms sound in the building, to have lighting devices turned on to deter the intruder and/or to have various doors locked or unlocked to facilitate deterrence and/or apprehension of the intruder. The alarm device control circuit 318 may be configured to control various alarm devices 308 accordingly in response to an indication of the most probable cause of an event from the event classification circuit 314. For example, the alarm device control circuit 318 may associate one or more alarm devices 308 with the variety of possible causes, and determine which alarm devices 308 to control based on which devices are associated with the most probable cause. As another example, the alarm device control circuit 318 may store control logic, alarm actions, etc. for each of the possible causes, and select the control logic and alarm actions executed based on which cause is determined to be the most probable cause. For example, control of the alarm devices 308 may be tailored based on the identification of the most probable cause to mitigate or deter the most probable cause, for example to limit the risks associated therewith. A variety of control logic is possible in various embodiments.

Figure 8:
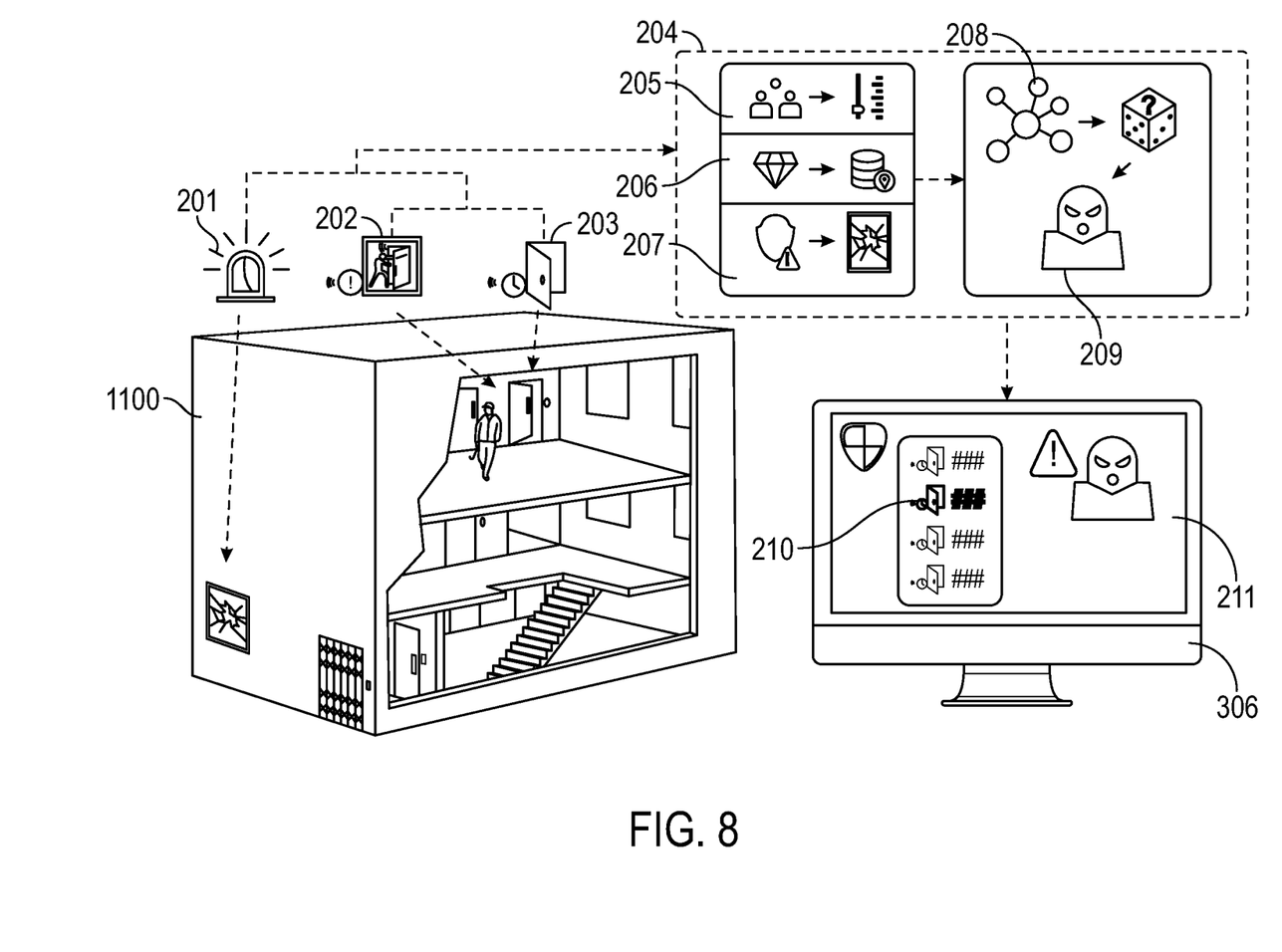
FIG. 8 is an illustration of an example implementation of the alarm management system of FIG. 2 detecting an intrusion event, according to an exemplary embodiment.

Referring now to FIG. 8, a visualization of operation of the alarm management system 300 for the building 1100 for an example of an intruder-caused DHO event is shown, according to an exemplary embodiment. More particularly, FIG. 8 illustrates a possible way in which the output of the alarm management system 300 may appear to an operator, based on a scenario where an intruder causes a DHO alarm. As shown in FIG. 8, connected building sensors and systems (i.e., data sources 302) detect various events and raise alarms. In the example shown, a glass break alarm 201, a door forced open (DFO) alarm 202, and, on the same door, a DHO alarm 203 are detected by various sensors and provided to the alarm analysis circuit 304 to be ingested to the model (visualized as box 204). The following data is also received at the alarm analysis circuit 304 and used with the Bayesian model: occupancy is determined to be low (visualized by image 205), the door is identified as protecting a critical server room (visualized by image 206), and the glass break event is classed as a nearby threat (visualized as image 207).

This data is processed by the Bayesian network (visualized by image 208), which calculates that the most likely explanation for the DHO is an intruder (visualized by intruder icon 209). The DHO alarm is highlighted in the monitoring dashboard (shown as GUI 210) and an intruder alert is raised (shown as an intruder icon 211 on the GUI 210). An operator is thereby alerted of the probability that an intruder has entered the building. It should be understood that FIG. 8 shows one example embodiment, and that the present disclosure contemplates various scenarios and various graphical user interface designs.

Configuration of Exemplary Embodiments

The construction and arrangement of the systems and methods as shown in the various exemplary embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements may be reversed or otherwise varied, and the nature or number of discrete elements or positions may be altered or varied. Accordingly, all such modifications are intended to be included within the scope of the present disclosure. The order or sequence of any process or method steps may be varied or re-sequenced according to alternative embodiments. Other substitutions, modifications, changes, and omissions may be made in the design, operating conditions and arrangement of the exemplary embodiments without departing from the scope of the present disclosure.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium. Thus, any such connection is properly termed a machine-readable medium. Combinations of the above are also included within the scope of machine-readable media. Machine-executable instructions include, for example, instructions and data which cause a general-purpose computer, special purpose computer, or special purpose processing machines to perform a certain function or group of functions.

As used herein, the term "circuit" used herein may include hardware structured to execute the functions described herein. In some embodiments, each respective "circuit" may include machine-readable media for configuring the hardware to execute the functions described herein. The circuit may be embodied as one or more circuitry components including, but not limited to, processing circuitry, network interfaces, peripheral devices, input devices, output devices, sensors, etc. In some embodiments, a circuit may take the form of one or more analog circuits, electronic circuits (e.g., integrated circuits (IC), discrete circuits, system on a chip (SOCs) circuits, etc.), telecommunication circuits, hybrid circuits, and any other type of "circuit." In this regard, the "circuit" may include any type of component for accomplishing or facilitating achievement of the operations described herein. For example, a circuit as described herein may include one or more transistors, logic gates (e.g., NAND, AND, NOR, OR, XOR, NOT, XNOR, etc.), resistors, multiplexers, registers, capacitors, inductors, diodes, wiring, and so on).

The "circuit" may also include one or more processors communicably coupled to one or more memory or memory devices. In this regard, the one or more processors may execute instructions stored in the memory or may execute instructions otherwise accessible to the one or more processors. In some embodiments, the one or more processors may be embodied in various ways. The one or more processors may be constructed in a manner sufficient to perform at least the operations described herein. In some embodiments, the one or more processors may be shared by multiple circuits (e.g., circuit A and circuit B may comprise or otherwise share the same processor which, in some example embodiments, may execute instructions stored, or otherwise accessed, via different areas of memory). Alternatively or additionally, the one or more processors may be structured to perform or otherwise execute certain operations independent of one or more co-processors. In other example embodiments, two or more processors may be coupled via a bus to enable independent, parallel, pipelined, or multi-threaded instruction execution. Each processor may be implemented as one or more general-purpose processors, application specific integrated circuits (ASICs), field programmable gate arrays (FPGAs), digital signal processors (DSPs), or other suitable electronic data processing components structured to execute instructions provided by memory. The one or more processors may take the form of a single core processor, multi-core processor (e.g., a dual core processor, triple core processor, quad core processor, etc.), microprocessor, etc. In some embodiments, the one or more processors may be external to the apparatus, for example the one or more processors may be a remote processor (e.g., a cloud-based processor). Alternatively or additionally, the one or more processors may be internal and/or local to the apparatus. In this regard, a given circuit or components thereof may be disposed locally (e.g., as part of a local server, a local computing system, etc.) or remotely (e.g., as part of a remote server such as a cloud-based server). To that end, a "circuit" as described herein may include components that are distributed across one or more locations. The present disclosure contemplates methods, systems and program products on any machine-readable media for accomplishing various operations. The embodiments of the present disclosure can be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general-purpose computer, special purpose computer, or special purpose processing machines to perform a certain function or group of functions.

What is claimed is:

1. An alarm management system comprising:
    a plurality of data sources configured to provide data including a security alarm occurring at a building;
    a processing circuit configured to:
        receive the data from the plurality of data sources;
        apply a Bayesian network model to the data to generate a probability score for each of a plurality of possible causes of the security alarm, the plurality of possible causes including a threat and a non-threat;
        identify a most probable cause of the security alarm as a first cause of the plurality of possible causes having a highest probability score; and
        execute an action with respect to the most probable cause of the security alarm.

2. The alarm management system of claim 1, wherein the processing circuit is further configured to:
    determine whether the first cause is in a set of pre-selected causes for which an alert is to be generated; and
    in response to determining that the first cause is in the set of pre-selected causes, generate a graphical user interface that identifies the security alarm and the first cause.

3. The alarm management system of claim 1, wherein the processing circuit is further configured to, in response to determining that the first cause is not in a set of pre-selected causes, refrain from generating a graphical user interface.

4. The alarm management system of claim 1, wherein the processing circuit is configured to execute the action by controlling one or more alarm devices located in or around the building to act in response to the most probable cause.

5. The alarm management system of claim 1, further comprising one or more alarm devices, wherein the one or more alarm devices are configured to deter the most probable cause.

6. The alarm management system of claim 1, wherein the plurality of data sources comprise an HVAC system and a weather station.

7. The alarm management system of claim 1, wherein the plurality of data sources comprise occupancy sensors and a building access system.

8. One or more non-transitory computer-readable media storing program instructions that, when executed by a processor, cause the processor to perform operations comprising:
    identifying an occurrence of a security alarm occurring at a building;
    receiving data from a plurality of data sources;
    applying a Bayesian network model to the data to generate a probability score for each of a plurality of possible causes of the security alarm, the plurality of possible causes including a threat and a non-threat;
    identifying a most probable cause of the security alarm as a first cause of the plurality of possible causes having a highest probability score; and
    executing an action with respect to the most probable cause of the security alarm.

9. The non-transitory computer-readable media of claim 8, wherein the operations comprise:
    determining whether the first cause is in a set of pre-selected causes for which an alert is to be generated; and in response to determining that the first cause is in the set of pre-selected causes, generating a graphical user interface that identifies the security alarm and the first cause.

10. The non-transitory computer-readable media of claim 9, wherein the operations comprise:
in response to determining that the first cause is not in the set of pre-selected causes, refraining from generating the graphical user interface.

11. The non-transitory computer-readable media of claim 8, wherein executing the action comprises controlling one or more alarm devices located in or around the building to act in response to the most probable cause.

12. The non-transitory computer-readable media of claim 11, wherein controlling the one or more alarm devices comprises determining a particular action of the one or more alarm devices configured to deter or mitigate the most probable cause and controlling the one or more alarm devices to perform the action.

13. The non-transitory computer-readable media of claim 8, wherein the plurality of data sources comprise two or more of HVAC equipment, a weather station, a social media platform, a scheduling system, an occupancy sensor, a lighting system, an access system, and a security system.

14. The non-transitory computer-readable media of claim 8, wherein identifying the occurrence of the security alarm comprises receiving a door-held-open alarm from a door security device.

15. A method, comprising:
receiving data from a plurality of data sources, the data including a security alarm occurring at a building;
applying a Bayesian network model to the data to generate a probability score for each of a plurality of possible causes of the security alarm, the plurality of possible causes including a threat and a non-threat;
identifying a most probable cause of the security alarm as a first cause of the plurality of possible causes having a highest probability score; and
executing an action with respect to the most probable cause of the security alarm.

16. The method of claim 15, wherein executing the action comprises:
determining whether the first cause is in a set of pre-selected causes for which an alert is to be generated; and
in response to determining that the first cause is in the set of pre-selected causes, generating a graphical user interface that identifies the security alarm and the first cause; and
in response to determining that the first cause is not in the set of pre-selected causes, refraining from generating the graphical user interface.

17. The method of claim 15, wherein executing the action comprises:
identifying one or more alarm devices associated with the most probable cause of the security alarm; and
controlling the one or more alarm devices to act in response to the most probable cause.

18. The method of claim 17, wherein controlling the one or more alarm devices comprises mitigating or deterring the most probable cause.

19. The method of claim 15, wherein the plurality of data sources comprise two or more of HVAC equipment, a weather station, a social media platform, a scheduling system, an occupancy sensor, a lighting system, an access system, and a security system.

20. The method of claim 15, wherein the security alarm is a door-held-open alarm and the plurality of possible causes comprise tailgating, airflow, and intrusion.

21. The alarm management system of claim 1, wherein the Bayesian network model includes:
a plurality of nodes representing one or more security events and the plurality of possible causes of the security alarm; and
relationship elements between the plurality of nodes indicating probability relationships between the plurality of nodes.

* * * * *